US012573709B2

(12) United States Patent
Xu et al.

(10) Patent No.: US 12,573,709 B2
(45) Date of Patent: Mar. 10, 2026

(54) ENERGY STORAGE APPARATUS AND POWER-CONSUMING DEVICE

(71) Applicant: Hithium Tech HK Limited, Kowloon (HK)

(72) Inventors: Weidong Xu, Guangdong (CN); Yongfeng Xiong, Guangdong (CN); Feng Wang, Guangdong (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 25 days.

(21) Appl. No.: 18/532,593

(22) Filed: Dec. 7, 2023

(65) Prior Publication Data

US 2024/0297396 A1 Sep. 5, 2024

(30) Foreign Application Priority Data

Feb. 9, 2023 (CN) .......................... 202310091079.2

(51) Int. Cl.
H01M 50/342 (2021.01)
H01M 50/147 (2021.01)
(Continued)

(52) U.S. Cl.
CPC ..... H01M 50/3425 (2021.01); H01M 50/147 (2021.01); H01M 50/172 (2021.01);
(Continued)

(58) Field of Classification Search
CPC ............... H01M 50/15; H01M 50/342; H01M 50/3425; H01M 50/147; H01M 50/172;
(Continued)

(56) References Cited

U.S. PATENT DOCUMENTS

2019/0237728 A1 8/2019 Wakimoto et al.
2020/0185694 A1 6/2020 Zhang
2023/0048535 A1* 2/2023 Fujii ................ H01M 50/3425

FOREIGN PATENT DOCUMENTS

CN 204946949 U 1/2016
CN 105932181 A 9/2016
(Continued)

OTHER PUBLICATIONS

WIPO, International Search Report and Written Opinion for International Patent Application No. PCT/CN2023/075254, Sep. 14, 2023, 12 pages.

(Continued)

*Primary Examiner* — Stephen J Yanchuk
(74) *Attorney, Agent, or Firm* — Hodgson Russ LLP

(57) ABSTRACT

The present disclosure provides an energy storage apparatus and a power-consuming device. The energy storage apparatus includes an electrode assembly, a connector, and an end cover assembly. The end cover assembly includes a pole assembly, a top cover, a stimulus-response member, and an explosion-proof assembly. The pole assembly includes a metal block, where the metal block is electrically connected to the connector, and the metal block has a preset surface. The top cover is disposed at an interval with the preset surface of the metal block, where the top cover defines a through hole and an explosion-proof hole arranged at an interval with each other, and an orthographic projection of the through hole on the preset surface falls within a range of the preset surface.

20 Claims, 9 Drawing Sheets

(51) Int. Cl.

| | | |
|---|---|---|
| *H01M 50/172* | (2021.01) | |
| *H01M 50/186* | (2021.01) | |
| *H01M 50/536* | (2021.01) | |
| *H01M 50/578* | (2021.01) | |

(52) U.S. Cl.
CPC ....... *H01M 50/186* (2021.01); *H01M 50/536* (2021.01); *H01M 50/578* (2021.01); *H01M 2200/20* (2013.01)

(58) Field of Classification Search
CPC ............. H01M 50/186; H01M 50/536; H01M 50/578; H01M 50/103; H01M 2200/00; H01M 2200/20
See application file for complete search history.

(56) References Cited

FOREIGN PATENT DOCUMENTS

| CN | 206098477 | U | 4/2017 |
|---|---|---|---|
| CN | 107369796 | A | 11/2017 |
| CN | 107579172 | A | 1/2018 |
| CN | 206947389 | U | 1/2018 |
| CN | 206947390 | U | 1/2018 |
| CN | 207183331 | U | 4/2018 |
| CN | 207183382 | U | 4/2018 |
| CN | 107994142 | A | 5/2018 |
| CN | 207353312 | U | 5/2018 |
| CN | 207896135 | U | 9/2018 |
| CN | 207896195 | U | 9/2018 |
| CN | 111446388 | A | 7/2020 |
| CN | 212659598 | U | 3/2021 |
| CN | 213483850 | U | 6/2021 |
| CN | 113964443 | A | 1/2022 |
| CN | 216793925 | U | 6/2022 |
| EP | 3121867 | A1 | 1/2017 |
| KR | 20180005455 | A | 1/2018 |
| WO | 2019174087 | A1 | 9/2019 |

OTHER PUBLICATIONS

CNIPA, First Office Action for corresponding Chinese Patent Application No. 202310091079.2, May 5, 2023, 16 pages.
CNIPA, Second Office Action for corresponding Chinese Patent Application No. 202310091079.2, May 18, 2023, 23 pages.
CNIPA, Notice of Allowance for corresponding Chinese Patent Application No. 202310091079.2, Jun. 8, 2023, 10 pages.
EPO, Extended European Search Report issued in corresponding European Patent Application No. 23220095.6, Jun. 12, 2024, 8 pages.

* cited by examiner

ENERGY STORAGE APPARATUS AND POWER-CONSUMING DEVICE

CROSS-REFERENCE TO RELATED APPLICATION(S)

This application claims priority under 35 U.S.C. § 119(a) to Chinese Patent Application No. 202310091079.2, filed Feb. 9, 2023, the entire disclosure of which is hereby incorporated by reference.

TECHNICAL FIELD

The present disclosure relates to the technical field of energy storage, and specifically, to an energy storage apparatus and a power-consuming device.

BACKGROUND

An explosion-proof valve or an explosion-proof sheet is typically disposed on end cover assembly of an energy storage apparatus, such as a battery, so that when an internal air pressure of the energy storage apparatus increases, the explosion-proof valve or the explosion-proof sheet can be burst in time to relieve the pressure.

SUMMARY

Embodiments of a first aspect of the present disclosure provide an energy storage apparatus. The energy storage apparatus includes an electrode assembly, a connector, and an end cover assembly. The connector is electrically connected to the electrode assembly. The end cover assembly is arranged at a side of the connector away from the electrode assembly. The end cover assembly includes a pole assembly, a top cover, a stimulus-response member, and an explosion-proof assembly.

The pole assembly includes a metal block, where the metal block is electrically connected to the connector, and the metal block has a preset surface.

The top cover is disposed at an interval with the preset surface of the metal block, where the top cover defines a through hole and an explosion-proof hole arranged at an interval with each other, and an orthographic projection of the through hole on the preset surface falls within a range of the preset surface.

The stimulus-response member seals the through hole and is connected to the top cover, where the stimulus-response member is configured to abut against the metal block to short-circuit the energy storage apparatus in response to the energy storage apparatus reaching a first pressure value. The stimulus-response member includes an abutting part, a deformation part, and a connecting part which are sequentially connected in a bent manner. The deformation part is arranged surrounding peripheries of the abutting part. The connecting part is arranged surrounding peripheries of the deformation part. The connecting part is connected to the top cover. The deformation part is bent from an end of the connecting part away from the top cover in a direction away from the metal block. The abutting part is configured to abut against the metal block to short-circuit the energy storage apparatus in response to the energy storage apparatus reaching the first pressure value. A minimum thickness of the deformation part is less than a thickness of the abutting part and is less than a thickness of the connecting part. A range of the minimum thickness d1 of the deformation part can be $0.3 \text{ mm} \le d1 \le 1.0 \text{ mm}$. A range of the thickness d3 of the abutting part can be $1.6 \text{ mm} \le d3 \le 3.4 \text{ mm}$. A range of the thickness d4 of the connecting part can be $0.45 \text{ mm} \le d4 \le 1.5 \text{ mm}$.

The explosion-proof assembly includes an explosion-proof sheet, where the explosion-proof sheet is configured to seal the explosion-proof hole and is connected to the top cover, and the explosion-proof sheet is configured to burst in response to the energy storage apparatus reaching a second pressure value. The explosion-proof sheet is provided with a notch. A thickness of an outer periphery portion of the explosion-proof sheet connected to or welded to the top cover is greater than a thickness of a center portion of the explosion-proof sheet. Each of the thickness of the center portion and the thickness of the outer periphery portion of the explosion-proof sheet is greater than a thickness of the notch. A range of a ratio of the minimum thickness d1 of the deformation part to a minimum thickness d2 of the explosion-proof sheet can be $2 \le d1/d2 \le 3$.

The range of a ratio of the first pressure value P1 to the second pressure value P2 can be $0.4 \le P1/P2 \le 0.87$; and a thickness of the stimulus-response member can be in a range of 0.1 mm to 6.2 mm.

A second aspect of the present disclosure provides a power-consuming device. The power-consuming device includes a power-consuming device body and the energy storage apparatus according to the embodiments of the present disclosure, where the energy storage apparatus is configured to supply power to the power-consuming device body.

BRIEF DESCRIPTION OF THE DRAWINGS

To describe the technical solutions of the embodiments of the present disclosure more clearly, the following briefly introduces the accompanying drawings for describing the embodiments. The accompanying drawings in the following description show merely some embodiments of the present disclosure, and a person of ordinary skill in the art may still derive other drawings from these accompanying drawings.

DESCRIPTIONS OF REFERENTIAL NUMERALS

Figure 1:
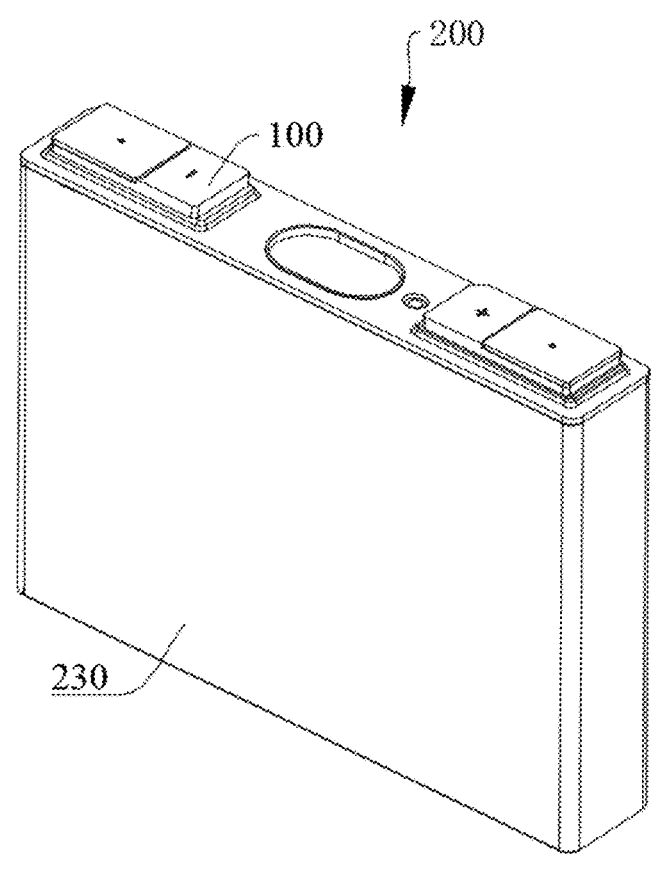
FIG. 1 is a schematic structural diagram of an energy storage apparatus according to an embodiment of the present disclosure.

100—end cover assembly, 10—top cover, 11—through hole, 111—first sub-hole, 113—second sub-hole, 13—penetration hole, 15—explosion-proof hole, 30—pole assembly, 30*a*—positive pole assembly, 30*b*—negative pole assembly, 31—metal block, 301—preset surface, 311—first part, 313—second part, 33—stimulus-response member, 33*a*—positive stimulus-response member, 33*b*—negative stimulus-response member, 331—abutting part, 333—deformation part, 335—connecting part, 35—upper plastic member, 37—pole, 371—first flange part, 373—first penetration part, 39—sealing member, 391—second flange part, 393—second penetration part, 50—lower plastic member, 51—first vent, 53—second vent, 70—explosion-proof assembly, 71—explosion-proof sheet, 711—outer periphery portion, 712—center portion, 713—notch, 73—protection sheet, 200—energy storage apparatus, 210—connector, 230—electrode assembly, 231—tab, 232—electrode, 2311—welding part, 300—power-consuming device, 310—power-consuming device body.

DETAILED DESCRIPTION

To enable a person skilled in the art to better understand the solutions of the present disclosure, the technical solutions in embodiments of the present disclosure are clearly and completely described in the following with reference to the accompanying drawings in the embodiments of the present disclosure. The described embodiments are merely some rather than all of the embodiments of the present disclosure. All other embodiments obtained by a person of ordinary skill in the art based on the embodiments of the present disclosure shall fall within the protection scope of the present disclosure.

In the specification, the claims, and the accompanying drawings of the present disclosure, the terms "first", "second", and the like are intended to distinguish between different objects, but do not indicate a particular order thereof. Moreover, the terms "include", "contain" and any other variants mean to cover the non-exclusive inclusion, for example, a process, method, system, product, or device that includes a list of steps or units is not limited to those listed steps or units, but may optionally include other steps or units not listed, or may optionally include other steps or units inherent to such a process, method, system, product, or device.

The following describes the technical solutions of the embodiments in the present disclosure with reference to the accompanying drawings.

It should be noted that, for ease of description, in the embodiments of the present disclosure, the same referential numerals represent the same components, and for brevity, detailed descriptions of the same components in different embodiments are omitted.

An explosion-proof valve or an explosion-proof sheet is typically disposed on an end cover assembly of an energy storage apparatus, such as a battery, so that when an internal air pressure of the energy storage apparatus increases, the explosion-proof valve or the explosion-proof sheet can be burst in time to relieve the pressure. However, when the explosion-proof valve or the explosion-proof sheet is burst, leakage of an electrolyte is prone may be caused, which produces pollution.

In view of the above problem, embodiments of the present disclosure provide an energy storage apparatus for which leakage of an electrolyte is avoided.

Embodiments of a first aspect of the present disclosure provide an energy storage apparatus. The energy storage apparatus includes an electrode assembly, a connector, and an end cover assembly. The connector is electrically connected to the electrode assembly. The end cover assembly is arranged at a side of the connector away from the electrode assembly. The end cover assembly includes a pole assembly, a top cover, a stimulus-response member, and an explosion-proof assembly.

The pole assembly includes a metal block, where the metal block is electrically connected to the connector, and the metal block has a preset surface.

The top cover is disposed at an interval with the preset surface of the metal block, where the top cover defines a through hole and an explosion-proof hole arranged at an interval with each other, and an orthographic projection of the through hole on the preset surface falls within a range of the preset surface.

The stimulus-response member seals the through hole and is connected to the top cover, where the stimulus-response member is configured to abut against the metal block to short-circuit the energy storage apparatus in response to the energy storage apparatus reaching a first pressure value.

The explosion-proof assembly includes an explosion-proof sheet, where the explosion-proof sheet is configured to seal the explosion-proof hole and is connected to the top cover, and the explosion-proof sheet is configured to burst in response to the energy storage apparatus reaching a second pressure value.

The range of a ratio of the first pressure value $P1$ to the second pressure value $P2$ can be $0.4 \leq P1/P2 \leq 0.87$; and a thickness of the stimulus-response member can be in a range of 0.1 mm to 6.2 mm.

Further, a range of a difference between the second pressure value $P2$ and the first pressure value $P1$ can be $0.1 \ \text{Mpa} \leq P2 - P1 \leq 0.3 \ \text{Mpa}$.

Further, a range of the first pressure value P1 is 0.35 Mpa≤P1≤0.65 Mpa, and a range of the second pressure value P2 can be 0.75 Mpa≤P2≤1.05 Mpa.

Further, the pole assembly includes a positive pole assembly and a negative pole assembly, and the stimulus-response member includes a positive stimulus-response member and a negative stimulus-response member. The positive stimulus-response member is configured to deform to abut against the metal block of the positive pole assembly in response to the energy storage apparatus reaching a first sub-pressure value P11; and the negative stimulus-response member is configured to deform to abut against the metal block of the negative pole assembly in response to the energy storage apparatus reaching a second sub-pressure value P12, where P12<P11. The first pressure value P1 includes the first sub-pressure value P11 and the second sub-pressure value P12.

Further, the stimulus-response member includes an abutting part, a deformation part, and a connecting part which are sequentially connected in a bent manner. The deformation part is arranged surrounding peripheries of the abutting part. The connecting part is arranged surrounding peripheries of the deformation part. The connecting part is connected to the top cover. The deformation part is bent from an end of the connecting part away from the top cover in a direction away from the metal block. The abutting part is configured to abut against the metal block to short-circuit the energy storage apparatus in response to the energy storage apparatus reaching the first pressure value. A minimum thickness of the deformation part is less than a thickness of the abutting part and is less than a thickness of the connecting part. A range of a ratio of the minimum thickness d1 of the deformation part to a minimum thickness d2 of the explosion-proof sheet can be 2≤d1/d2≤3.

Further, a range of the minimum thickness d1 of the deformation part can be 0.3 mm≤d1≤1.0 mm.

Further, a range of the minimum thickness d2 of the explosion-proof sheet can be 0.05 mm≤d2≤0.15 mm.

Further, a range of an angle α between a surface of the deformation part facing the metal block and a direction in which the metal block and the stimulus-response member are stacked can be 25°≤α≤75°.

Further, a range of a thickness d3 of the abutting part can be 1.6 mm≤d3≤3.4 mm; and a range of a thickness d4 of the connecting part can be 0.45 mm≤d4≤1.5 mm.

Further, the pole assembly further includes a pole, where the pole passes through the top cover and is insulated from the top cover, and the pole is electrically connected to each of the metal block and the connector.

The electrode assembly includes an electrode and a tab electrically connected to the electrode, the tab is provided with a welding part welded to the connector, and an orthographic projection of the welding part on the preset surface falls within the range of an orthographic projection of the stimulus-response member on the preset surface.

A second aspect of the present disclosure provides a power-consuming device. The power-consuming device includes a power-consuming device body and the energy storage apparatus according to the embodiments of the present disclosure, where the energy storage apparatus is configured to supply power to the power-consuming device body.

The energy storage apparatus of the embodiments of the present disclosure includes the end cover assembly. The end cover assembly includes the stimulus-response member. When the pressure in the energy storage apparatus reaches the first pressure value, the stimulus-response member deforms, and the center part of the stimulus-response member move towards the metal block and is flipped over, until the center part abuts against the metal block. Therefore, the energy storage apparatus can be connected in a short-circuited manner (short-circuit for short), so that the energy storage apparatus stops charging or discharging, thereby avoiding explosion of the energy storage apparatus caused by continuous increase of the pressure in the energy storage apparatus, and improving the use safety of the energy storage apparatus. In a case that the energy storage apparatus is not short-circuited even if the stimulus-response member is flipped over or in a case that the internal pressure of the energy storage apparatus still continues to increase even if the energy storage apparatus is short-circuited, when the internal pressure of the energy storage apparatus increases to a bursting pressure (that is, the second pressure value) of the explosion-proof sheet, the explosion-proof sheet is burst to relieve the pressure of the energy storage apparatus, so as to control released energy to be within a safe range, thereby achieving double insurance and improving the use safety of the energy storage apparatus. In addition, by controlling a ratio of a flip-over pressure of the stimulus-response member to the bursting pressure of the explosion-proof sheet (that is, a ratio of the first pressure value to the second pressure value) to be 0.4≤P1/P2≤0.87, normal use of the energy storage apparatus is protected by preventing the stimulus-response member of the energy storage apparatus from being flipped over excessively early to short-circuit the energy storage apparatus. In addition, a particular difference is set between the flip-over pressure of the stimulus-response member and the bursting pressure of the explosion-proof sheet, so that the explosion-proof sheet is not burst during or before flip-over of the stimulus-response member, and that the explosion-proof double-insurance function of the energy storage apparatus can be better achieved for the energy storage apparatus.

An explosion-proof valve or an explosion-proof sheet is typically disposed on end cover assembly of an energy storage apparatus, such as a battery, so that when an internal air pressure of the energy storage apparatus increases, the explosion-proof valve or the explosion-proof sheet can be burst in time to relieve the pressure. However, when the explosion-proof valve or the explosion-proof sheet is burst, an electrolyte is prone to sputtering everywhere. Therefore, a stimulus-response member is disposed on the end cover assembly, so that when an internal pressure of the energy storage apparatus increases but does not reach a bursting pressure of the explosion-proof valve or the explosion-proof sheet, positive and negative electrodes of the energy storage apparatus are short-circuited through deformation and flip-over of the stimulus-response member, to prevent the energy storage apparatus from continuing to charge and discharge, so as to prevent the pressure in the energy storage apparatus from continuing to increase, and to further prevent the electrolyte from sputtering everywhere during explosion of the explosion-proof valve or the explosion-proof sheet. However, the existing stimulus-response members have an unreasonable designed structure and often fail, and therefore cannot immediately short-circuit positive and negative electrodes of the energy storage apparatus when the positive and negative electrodes need to be short-circuited, or cannot deform to flip over even when explosion occurs. It may be understood that, the stimulus-response member is configured to deform in response to an increase of the pressure in the energy storage apparatus, so that when a gas in the energy storage apparatus has a pressure exceeding a preset pressure threshold, the stimulus-response member can deform to be in contact with metal conductive block. Therefore, positive and negative electrode assemblies are externally short-circuited, and further the stimulus-response member and a bottom portion of the metal conductive block are cut off due to fusion and clipping caused by a strong short-circuit current, so as to prevent the energy storage apparatus from continuing to charge and cause overcharging, and therefore the explosion of the energy storage apparatus can be avoided.

As illustrated in FIG. 1 to FIG. 5, the embodiments of the present disclosure provide an energy storage apparatus 200 including an electrode assembly 230, a connector 210, and an end cover assembly 100. The connector 210 is electrically connected to the electrode assembly 230. The end cover assembly 100 is arranged at a side of the connector 210 away from the electrode assembly 230, and the end cover assembly 100 includes a pole assembly 30, a top cover 10, a stimulus-response member 33, and an explosion-proof assembly 70. The pole assembly 30 includes a metal block 31, the metal block 31 is electrically connected to the connector 210, and the metal block 31 has a preset surface 301. The top cover 10 is disposed at an interval with the preset surface 301 of the metal block 31. The top cover 10 defines a through hole 11 and an explosion-proof hole 15 arranged at an interval with each other, and an orthographic projection of the through hole 11 on the preset surface 301 falls within a range of the preset surface 301. The stimulus-response member 33 seals the through hole 11 and is connected to the top cover 10. The stimulus-response member 33 is configured to abut against the metal blocks 31 to short-circuit the energy storage apparatus 200 in response to the energy storage apparatus 200 reaching a first pressure value. The explosion-proof assembly 70 includes an explosion-proof sheet 71. The explosion-proof sheet 71 is configured to seal the explosion-proof hole 15 and is connected to the top cover 10. The explosion-proof sheet 71 is configured to burst in response to the energy storage apparatus 200 reaching a second pressure value. A range of a ratio of the first pressure value P1 to the second pressure value P2 can be 0.4≤P1/P2≤0.87. A thickness of the stimulus-response member 33 can be in a range of 0.1 mm to 6.2 mm.

The energy storage apparatus 200 of the embodiments of the present disclosure can be applied to, but is not limited to, an energy storage apparatus such as a lithium ion secondary battery, a lithium ion primary battery, a lithium sulfur battery, a sodium lithium ion battery, a sodium ion battery, a magnesium ion battery, or an energy storage battery.

It may be understood that the connector 210 is arranged at a side of the top cover 10 away from the metal block 31. Specifically, the connector 210 is arranged at a side of a lower plastic member 50 away from the top cover 10. It may be understood that the connector 210 is stacked on a surface of the lower plastic member 50 away from the top cover 10, and an end of the connector 210 facing a surface of the lower plastic member 50 and approaching a first flange part 371 of a pole 37 is electrically connected (for example, welded) to the first flange part 371. An end of the connector 210 away from the surface of the lower plastic member 50 and away from the pole 37 is electrically connected (for example, welded) to a tab 231 of the electrode assembly 230.

It may be noted that the stimulus-response member 33 seals the through hole 11. It may be understood that the stimulus-response member 33 is received in the through hole 11, so as to seal the through hole 11, and to enable the stimulus-response member 33 to be electrically connected to the top cover 10.

The "first pressure value" is a pressure value of an air pressure which is generated in the energy storage apparatus 200 and causes the stimulus-response member 33 to deform. In other words, the "first pressure value" is a value of a pressure applied to the stimulus-response member 33, with a pressure direction towards the metal block 31, when the stimulus-response member 33 deforms (or bends) towards the metal block 31 and thus moves towards the metal block 31, that is, a pressure value required for the stimulus-response member 33 to flip over. The "second pressure value" refers to a pressure value of an air pressure which is generated in the energy storage apparatus 200 and causes the explosion-proof sheet 71 to be burst. In other words, the "second pressure value" is a pressure value when the pressure in the energy storage apparatus 200 is released during bursting of the explosion-proof sheet 71. It may also be understood that the first pressure value is a force applied to the stimulus-response member 33 toward the metal block 31 by an increase in the internal air pressure of the energy storage apparatus 200. The second pressure value is a force applied to the explosion-proof sheet 71 towards the metal block 31 by the increase in the internal air pressure of the energy storage apparatus 200.

Figures 3, 4, 5:
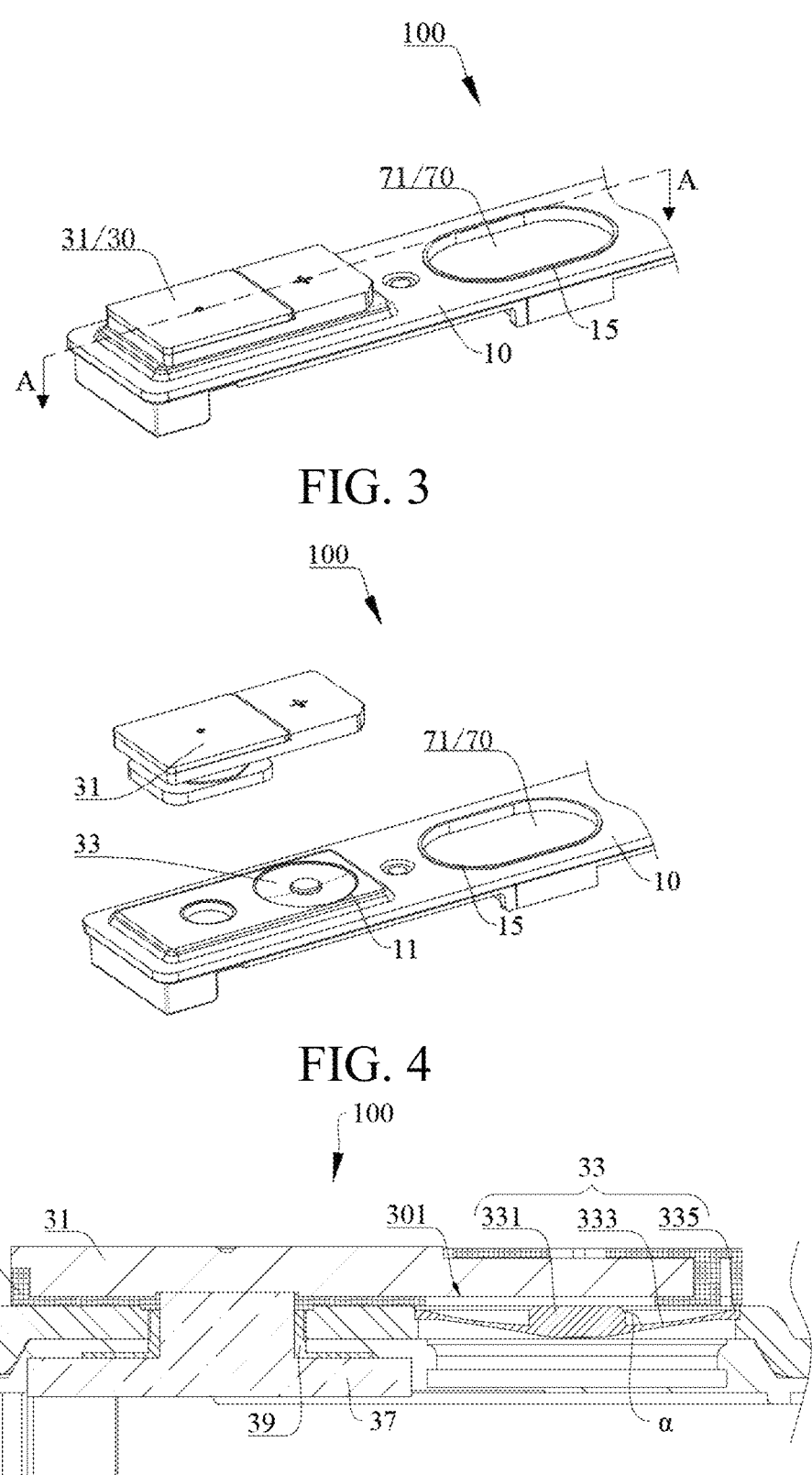
FIG. 3 is a schematic partial structural diagram of an end cover assembly according to an embodiment of the present disclosure.
FIG. 4 is a schematic partially-exploded structural diagram of an end cover assembly according to an embodiment of the present disclosure.
FIG. 5 is a schematic structural diagram of a partial cross-section of an end cover assembly along a line A-A in FIG. 3 according to an embodiment of the present disclosure.
Figure 6:
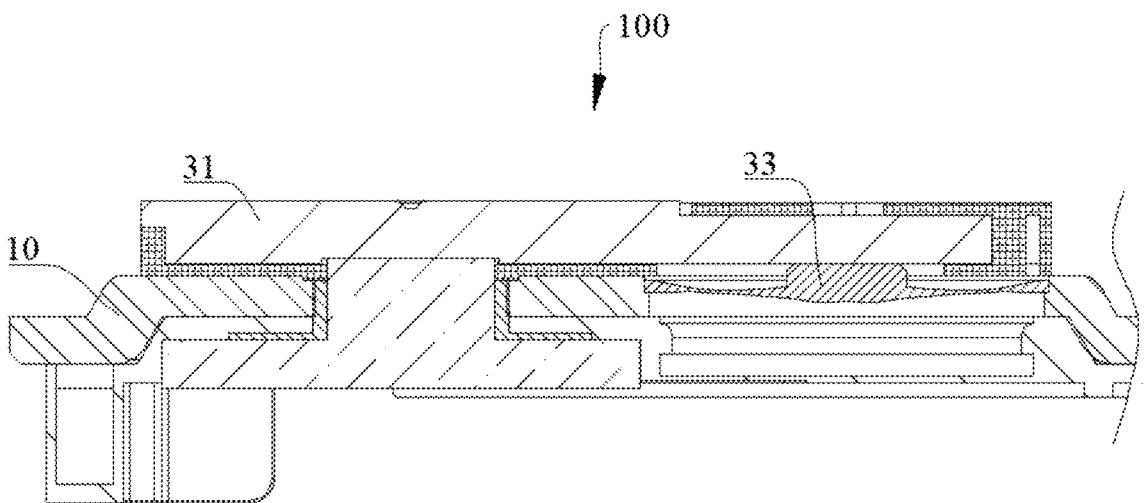
FIG. 6 is a schematic diagram of a partial cross-section of a structure along a line A-A in FIG. 1 after a stimulus-response member and a metal block are short-circuited according to an embodiment of the present disclosure.

It may be understood that, as illustrated in FIG. 5, when the energy storage apparatus 200 is in a normal working state (that is, an initial state), the metal block 31 is stacked with and spaced apart from the stimulus-response member 33. As illustrated in FIG. 6, when the energy storage apparatus 200 is in a short-circuited state, the metal block 31 abuts against the stimulus-response member 33, so that the metal block 31 are electrically connected to the stimulus-response member 33.

It may be understood that a range of a ratio of the first pressure value P1 to the second pressure value P2 can be 0.4≤P1/P2≤0.87. Specifically, the ratio P1/P2 of the first pressure value to the second pressure value may be, but is not limited to, 0.4, 0.5, 0.6, 0.7, 0.8, 0.87, or the like. In this embodiment, if the ratio of the first pressure value to the second pressure value is excessively small, the energy storage apparatus 200 is short-circuited when the energy storage apparatus 200 still has a large pressure difference with a bursting pressure (that is, the second pressure value) and is still within a safe use range, which affects the normal use of the energy storage apparatus 200. If the ratio of the first pressure value to the second pressure value is excessively large, a flip-over pressure (that is, the first pressure value) of the stimulus-response members 33 is excessively close to the bursting pressure (that is, the second pressure value) of the explosion-proof sheet 71, and the explosion-proof sheet 71 may have exploded during flip-over or even before flip-over of the stimulus-response members 33, which is prone to causing sputtering of an electrolyte or overflowing of a corrosive gas from the energy storage apparatus 200, to corrode peripheries of the energy storage apparatus 200. Therefore, the use safety of the energy storage apparatus 200 is affected, and further it is difficult to achieve double insurances.

It may be understood that the stimulus-response member 33 is uneven in thickness, and the thickness the stimulus-response member 33 at any position along an extending direction of the top cover 10 is in the range of 0.1 mm to 6.2 mm. A value of the thickness of the stimulus-response member 33 is taken by a random 5-point method or a random 10-point method to calculate an average thickness. In some cases, the stimulus-response member 33 includes a positive stimulus-response member disposed on the positive pole assembly and a negative stimulus-response member disposed on the negative pole assembly. It may be understood that average thicknesses of the positive stimulus-response member and the negative stimulus-response member can be within the range of 0.1 mm to 6.2 mm, and the positive stimulus-response member may prioritize to the negative stimulus-response member in abutting against the metal block 31, or the negative stimulus-response member may prioritize to the positive stimulus-response member in abutting against the metal block 31.

The energy storage apparatus 200 of the embodiments of the present disclosure includes an end cover assembly 100. The end cover assembly 100 includes a stimulus-response member 33. When a pressure in the energy storage apparatus 200 reaches a first pressure value, the stimulus-response member 33 deforms, and the center section of the stimulus-response member 33 moves towards the metal block 31 and is flipped over, until abuts against the metal block 31. Therefore, the energy storage apparatus 200 can be connected in a short-circuited manner (short-circuited for short), so that the energy storage apparatus 200 stops charging or discharging, thereby avoiding explosion of the energy storage apparatus 200 caused by continuous increase of the pressure in the energy storage apparatus 200, and improving the use safety of the energy storage apparatus 200. In a case that the energy storage apparatus 200 is not short-circuited even if the stimulus-response member 33 is flipped over or in a case that the internal pressure of the energy storage apparatus 200 continues to increase even if the energy storage apparatus 200 is short-circuited in response to the internal pressure of the energy storage apparatus 200 increasing to a bursting pressure (i.e., the second pressure value) of the explosion-proof sheet 71, the explosion-proof sheet 71 is burst to relieve the pressure of the energy storage apparatus 200, so as to control released energy to be within a safe range, thereby implementing the double-insurance function and improving the use safety of the energy storage apparatus 200. In addition, by controlling a ratio of a flip-over pressure of the stimulus-response member 33 to the bursting pressure of the explosion-proof sheet 71 (the first pressure value to the second pressure value) to be $0.4 \leq P1/P2 \leq 0.87$, normal use of the energy storage apparatus 200 is protected by preventing the stimulus-response member 33 of the energy storage apparatus 200 from being flipped over excessively early to short-circuit the energy storage apparatus 200. In addition, a particular difference is set between the flip-over pressure of the stimulus-response members 33 and the bursting pressure of the explosion-proof sheet 71, so that the explosion-proof sheet 71 is not burst during or before flip-over of the stimulus-response member 33, and that the explosion-proof double-insurance function of the energy storage apparatus 200 can be better implemented when applied to the energy storage apparatus 200.

In some embodiments, a range of a difference between the second pressure value P2 and the first pressure value P1 can be $0.1 \text{ Mpa} \leq P2-P1 \leq 0.3 \text{ Mpa}$. Specifically, the difference between the second pressure value P2 and the first pressure value P1 may be, but is not limited to, 0.1 Mpa, 0.15 Mpa, 0.2 Mpa, 0.25 Mpa, 0.3 Mpa, or the like. If the difference between the second pressure value P2 and the first pressure value P1 is excessively small, explosion of the explosion-proof sheet 71 is prone to be caused during flip-over or before flip-over of the stimulus-response member 33, and the explosion-proof double-insurance function of the energy storage apparatus 200 cannot be better implemented for the energy storage apparatus 200. If the difference between the second pressure value P2 and the first pressure value P1 is excessively large, the stimulus-response member 33 is likely to be flipped over early to short-circuit the energy storage apparatus 200, which affects the normal use of the energy storage apparatus 200.

Optionally, a range of the first pressure value P1 is $0.35 \text{ Mpa} \leq P1 \leq 0.65 \text{ Mpa}$. Specifically, the first pressure value may be, but is not limited to, 0.35 Mpa, 0.4 Mpa, 0.45 Mpa, 0.5 Mpa, 0.55 Mpa, 0.6 Mpa, 0.65 Mpa, or the like. If the first pressure value is excessively small, the stimulus-response member 33 may have been flipped over to abut against the metal block 31 to short-circuit the energy storage apparatus 200 when the energy storage apparatus 200 is still in a safe working environment, which affects the normal use of the energy storage apparatus 200. If the first pressure value is excessively large, a pressure required for flip-over of the stimulus-response member 33 is excessively large, and the explosion-proof sheet 71 may explode during flip-over or before flip-over of the stimulus-response member 33, which is prone to causing sputtering of an electrolyte or overflowing of a corrosive gas from the energy storage apparatus 200 to corrode peripheries of the energy storage apparatus 200. Therefore, implementation of the double-insurance function of the end cover assembly 100 is affected.

Optionally, a range of the second pressure value P2 is $0.75 \text{ Mpa} \leq P2 \leq 1.05 \text{ Mpa}$. Specifically, the second pressure value may be, but is not limited to, 0.75 Mpa, 0.8 Mpa, 0.85 Mpa, 0.9 Mpa, 0.95 Mpa, 1.0 Mpa, 1.05 Mpa, or the like. If the second pressure value is excessively small, the explosion-proof sheet 71 may have exploded to short-circuit the energy storage apparatus 200 when the energy storage apparatus 200 is still in a safe working environment, which affects the normal use of the energy storage apparatus 200. In addition, it is difficult to set a large difference between the second pressure value and the first pressure value, which affects implementation of the double-insurance function. If the second pressure value is excessively large, the pressure required for the explosion-proof sheet 71 to burst is excessively large, and during bursting of the explosion-proof sheet 71, an electrolyte in the energy storage apparatus 200 is caused to sputter severely, and even spattering of burst fragments is caused, which affects the safety of the energy storage apparatus 200.

Figure 7:
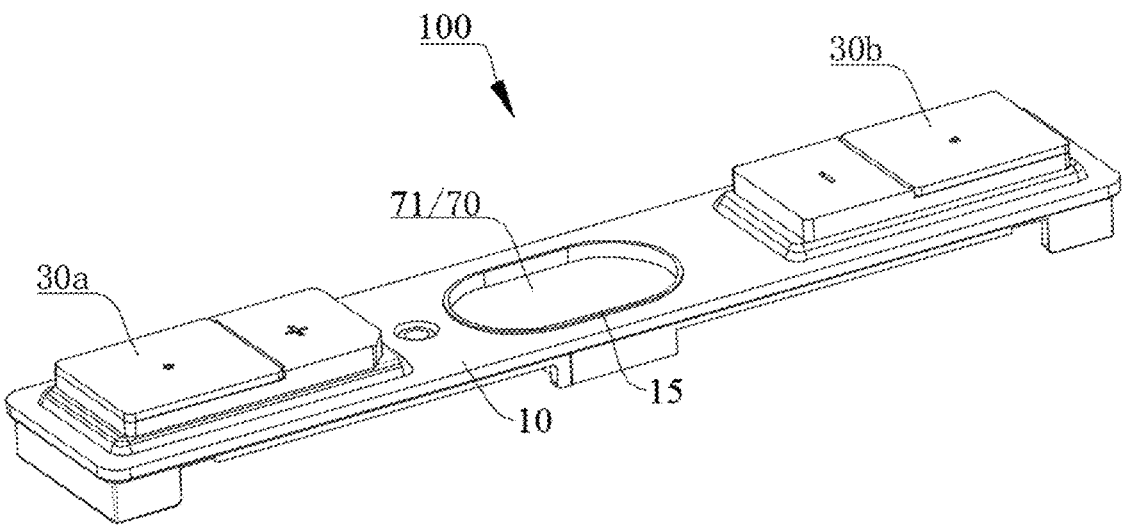
FIG. 7 is a schematic structural diagram of an end cover assembly according to an embodiment of the present disclosure.
Figures 8, 9:
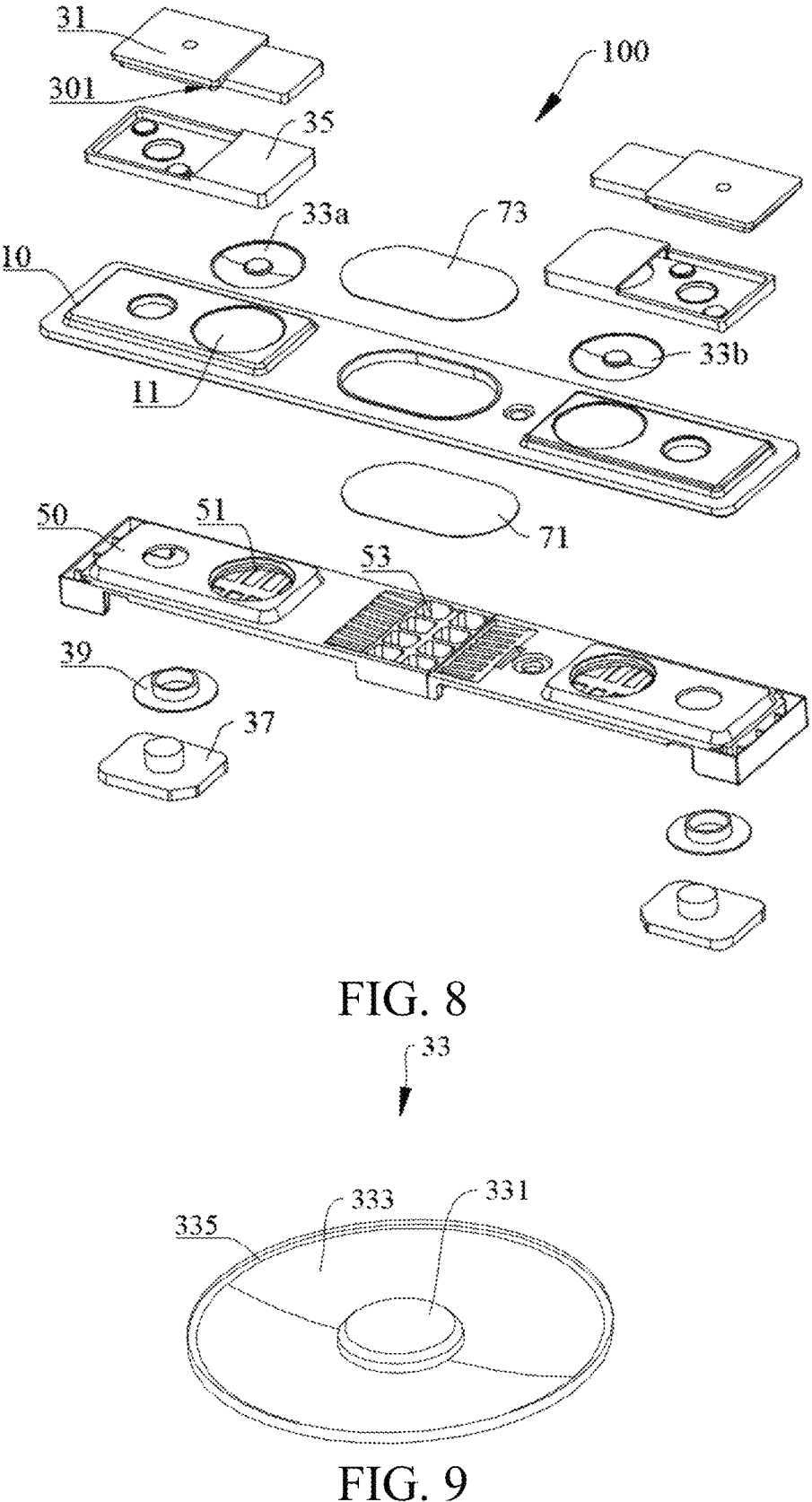
FIG. 8 is a schematic exploded structural diagram of an end cover assembly according to an embodiment of the present disclosure.
FIG. 9 is a schematic structural diagram of a stimulus-response member according to an embodiment of the present disclosure.

As illustrated in FIG. 7 and FIG. 8, optionally, the pole assembly 30 include a positive pole assembly 30a and a negative pole assembly 30b, and the stimulus-response member 33 include a positive stimulus-response member 33a and a negative stimulus-response member 33b. When the energy storage apparatus 200 reaches a first sub-pressure value P11, the positive stimulus-response member 33a deforms to abut against the metal block 31 of the positive pole assembly 30a. When the energy storage apparatus 200 reaches a second sub-pressure value P12, the negative stimulus-response member 33b deforms to abut against the metal block 31 of the negative pole assembly 30b, where P12<P11. The first pressure value P1 includes the first sub-pressure value P11 and the second sub-pressure value P12.

It may be understood that the positive pole assembly 30a and the negative pole assembly 30b each includes the metal block 31.

It may be understood that a range of a ratio of the first sub-pressure value P11 to the second pressure value P2 can be $0.4 \leq P11/P2 \leq 0.87$. A range of a ratio of the second sub-pressure value P12 to the second pressure value P2 can be $0.4 \leq P12/P2 \leq 0.87$.

It may be understood that the positive pole assembly 30a and the negative pole assembly 30b are respectively disposed on two opposite sides of the explosion-proof hole 15.

It may also be understood that the positive pole assembly 30*a*, the explosion-proof hole 15, and the negative pole assembly 30*b* are sequentially arranged along an extending direction (that is, a long edge direction) of the end cover assembly 100. The positive stimulus-response member 33*a* and the negative stimulus-response member 33*b* are respectively disposed on two opposite sides of the explosion-proof hole 15 along the extending direction (that is, the long edge direction) of the top cover 10.

Figure 10:
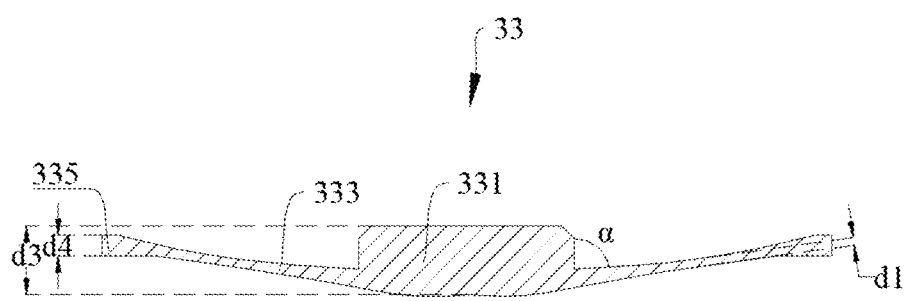
FIG. 10 is a schematic cross-sectional structural diagram of a stimulus-response member along a line A-A in FIG. 3 according to an embodiment of the present disclosure.
Figure 11:
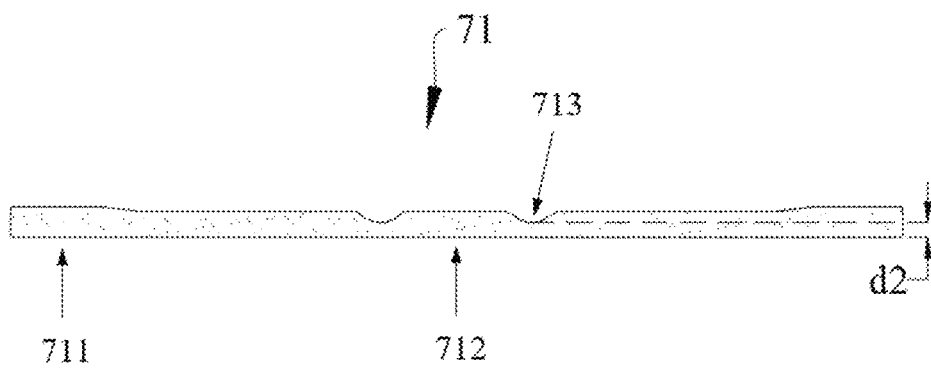
FIG. 11 is a schematic cross-sectional structural diagram of an explosion-proof sheet along a line A-A in FIG. 3 according to an embodiment of the present disclosure.

As illustrated in FIG. 9 to FIG. 11, in some embodiments, the stimulus-response member 33 includes an abutting part 331, a deformation part 333, and a connecting part 335 which are sequentially connected in a bent manner, the deformation part 333 is arranged surrounding peripheries of the abutting part 331, and the connecting part 335 is arranged surrounding peripheries of the deformation part 333. The connecting part 335 is connected to the top cover 10, and the deformation part 333 is bent from an end of the connecting part 335 away from the top cover 10 towards a direction away from the metal block 31. When the energy storage apparatus 200 reaches a first pressure value, the abutting part 331 abut against the metal block 31, so that the energy storage apparatus 200 is short-circuited. A minimum thickness of the deformation part 333 is less than a thickness of the abutting part 331 and is less than a thickness of the connecting part 335. A range of a ratio of the minimum thickness d1 of the deformation part 333 to a minimum thickness d2 of the explosion-proof sheet 71 can be $2 \leq d1/d2 \leq 3$.

It may be understood that when the pressure in the energy storage apparatus 200 reaches the first pressure value, the deformation part 333 deforms under the internal pressure of the energy storage apparatus 200, and the abutting part 331 move toward a direction approaching the metal block 31 until the abutting part 331 abuts against the metal block 31. Therefore, both the metal block 31 of the positive pole assembly 30*a* and the metal block 31 of the negative pole assembly 30*b* are electrically connected to the top cover 10, so that the positive pole assembly 30*a* and the negative pole assembly 30*b* of the energy storage apparatus 200 are connected in a short-circuited manner (short-circuited for short). In this way, the energy storage apparatus 200 stops charging or discharging, thereby avoiding explosion of the energy storage apparatus 200 caused by continuous increase of the pressure in the energy storage apparatus 200, and improving the use safety of the energy storage apparatus 200.

Specifically, a ratio d1/d2 of the minimum thickness d1 of the deformation part 333 to the minimum thickness d2 of the explosion-proof sheet 71 may be, but is not limited to, 2, 2.2, 2.4, 2.6, 2.8, 3.0, or the like. If the ratio of the minimum thickness d1 of the deformation part 333 to the minimum thickness d2 of the explosion-proof sheet 71 is excessively small, the deformation part 333 deforms excessively early, so that the stimulus-response member 33 is flipped over to short-circuit the energy storage apparatus 200 excessively early, which affects the normal use of the energy storage apparatus 200. If the ratio of the minimum thickness d1 of the deformation part 333 to the minimum thickness d2 of the explosion-proof sheet 71 is excessively large, it is difficult to stagger the flip-over pressure of the stimulus-response member 33 and the bursting pressure of the explosion-proof sheet 71. In this case, the function of configuring the stimulus-response members 33 is lost, and it is difficult to implement the double-insurance function.

Optionally, the thickness of the deformation part 333 may be consistent or inconsistent. The thickness of the abutting part 331 is consistent, and the thickness of the connecting part 335 is consistent.

Optionally, a range of the thickness d1 of the deformation part 333 is 0.3 mm≤d1≤1.0 mm. Specifically, the thickness d1 of the deformation part 333 may be, but is not limited to, 0.3 mm, 0.35 mm, 0.4 mm, 0.5 mm, 0.55 mm, 0.6 mm, 0.65 mm, 0.7 mm, 0.75 mm, 0.85 mm, 1.0 mm, or the like. If the thickness of the deformation part 333 is excessively small, deformation will occur excessively early to short-circuit the energy storage apparatus 200, which affects the normal use of the energy storage apparatus 200. If the thickness of the deformation part 333 is excessively large, deformation cannot occur to short-circuit the energy storage apparatus 200 when the pressure in the energy storage apparatus 200 reaches the first pressure value, so that the stimulus-response member 33 will fail. When the thickness of the deformation part 333 is in a range of 0.35 mm and 1.0 mm, the deformation part 333 is enabled to have a particular strength, so that the deformation parts 333 will not deform when the internal pressure of the energy storage apparatus 200 is still small, and the deformation parts 333 will deform in time to abut against the metal block 31 when the internal pressure of the energy storage apparatus 200 reaches the first pressure value, so as to short-circuit the energy storage apparatus 200 to stop charging and discharging.

Optionally, a range of the minimum thickness d2 of the explosion-proof sheet 71 is 0.05 mm≤d2≤0.15 mm. Specifically, the minimum thickness d2 of the explosion-proof sheet 71 may be, but is not limited to, 0.05 mm, 0.07 mm, 0.09 mm, 0.11 mm, 0.13 mm, 0.15 mm, or the like. If the minimum thickness of the explosion-proof sheet 71 is excessively small, the explosion-proof sheet 71 will explode when the second pressure value in the energy storage apparatus 200 is relatively small, which affects the normal use of the energy storage apparatus 200. If the minimum thickness of the explosion-proof sheet 71 is excessively large, the second pressure value for explosion is excessively large when the explosion-proof sheet 71 is burst to release the pressure, which is prone to causing sputtering of electrolyte droplets or corrosive gas from the energy storage apparatus 200, to corrode the peripheries of the energy storage apparatus 200 or a battery, and affect the safety.

Optionally, the explosion-proof sheet 71 is provided with a notch 713, so that when the internal pressure of the energy storage apparatus 200 increases to the second pressure value, the explosion-proof sheet 71 is ruptured to burst, to release the pressure within the energy storage apparatus 200, so as to control the energy released by bursting of the explosion-proof assembly 70 to be within a safe range, and improve the use safety of the energy storage apparatus 200. It may be understood that the minimum thickness d2 of the explosion-proof sheet 71 refers to a minimum thickness of a position where the explosion-proof sheet 71 is provided with the notch 713.

It may be understood that the thickness of the explosion-proof sheet 71 is inconsistent. In some embodiments, the thickness of a portion of the explosion-proof sheet 71 connected to or welded to the top cover 10 are in a range of 0.5 mm to 0.6 mm. In other words, the thickness of an outer periphery portion 711 of the explosion-proof sheet 71 are in a range of 0.5 mm to 0.6 mm, for example, 0.5 mm, 0.52 mm, 0.54 mm, 0.56 mm, 0.58 mm, or 0.6 mm. The thicknesses of portions of the explosion-proof sheet 71 other than the outer periphery portion 711 and the notch 713 are in a range of 0.25 mm to 0.35 mm, for example, 0.25 mm, 0.28 mm, 0.3 mm, 0.32 mm, or 0.35 mm. It may be understood that the thickness of a portion of the explosion-proof sheet 71 connected to or welded to the top cover 10 is greater than the thickness of a center portion 712 of the explosion-proof sheet 71, so that the connection strength between the explosion-proof sheet 71 and the top cover 10 can be increased, and the stability of the connection between the explosion-proof sheet 71 and the top cover 10 before bursting can be enhanced. The thickness of the center portion 712 and the thickness of the outer periphery portion are each greater than the thickness of the notch 713, so that a bursting position of the explosion-proof sheet 71 can be controlled when the explosion-proof sheet 71 is burst, so as to reduce the safety problem caused by the bursting of the energy storage apparatus 200 to be within a relatively small range.

Optionally, a range of the thickness d3 of the abutting part 331 is 1.6 mm≤d3≤3.4 mm. Specifically, the thickness d3 of the abutting part 331 may be, but is not limited to, 1.6 mm, 1.8 mm, 1.9 mm, 2.0 mm, 2.2 mm, 2.4 mm, 2.8 mm, 3.0 mm, 3.2 mm, or 3.4 mm. In this way, the abutting part 331 can be better embedded between upper and lower surfaces (that is, a surface facing the metal block 31 and a surface away from the metal block 31) of the top cover 10.

Optionally, a range of the thickness d4 of the connecting part 335 is 0.45 mm≤d4≤1.5 mm. Specifically, the thickness d4 of the connecting part 335 may be, but is not limited to, 0.45 mm, 0.6 mm, 0.8 mm, 1.0 mm, 1.2 mm, 1.4 mm, 1.5 mm, or the like. If the thickness of the connecting part 335 is excessively small, when the stimulus-response member 33 is deformed under pressure, the connecting part 335 may be damaged during the deformation of the deformation part 333, resulting in damage to the energy storage apparatus 200. If the thickness of the connecting part 335 is excessively large, when the stimulus-response member 33 is installed in the through hole 11 of the top cover 10, the stimulus-response member 33 exceeds the two opposite surfaces of the top cover 10, and the stimulus-response member 33 may be accidentally touched during subsequent assembling of other components of the end cover assembly 100, resulting in an inaccurate pressure value for triggering flip-over of the stimulus-response member 33.

Optionally, a range of an angle α between a direction in which the metal block 31 and the stimulus-response member 33 are stacked and a surface of the deformation part 333 facing the metal block 31 is 25°≤α≤75°. In other words, a range of an angle α between a direction perpendicular to the metal block 31 or the top cover 10 and the deformation part 333 is 25°≤α≤75°. Specifically, the angle α between the direction in which the metal block 31 and the stimulus-response member 33 are stacked and the deformation part 333 may be, but is not limited to, 25°, 30°, 35°, 40°, 45°, 50°, 55°, 60°, 65°, 70°, 75°, or the like. A smaller angle between the direction in which the metal block 31 and the stimulus-response member 33 are stacked and the deformation part 333 indicates a larger distance by which the abutting part 331 moves in the direction approaching the metal block 31 when the stimulus-response member 33 is flipped over. However, if the angle between the direction in which the metal block 31 and the stimulus-response member 33 are stacked and the deformation part 333 is excessively small, the thickness of the abutting part 331 in a direction in which the metal block 31 and an smooth aluminum sheet are stacked may increase, which is not conducive to the lightening and thinning of the end cover assembly 100. In addition, the distance that the abutting part 331 needs to move when the stimulus-response member 33 is flipped over increases greatly, resulting in an increase in the time for the stimulus-response member 33 to flip over, which not conducive to short-circuiting the energy storage apparatus 200 in time. If the angle between the direction in which the metal block 31 and the stimulus-response member 33 are stacked and the deformation part 333 is excessively large, a maximum movable distance of the abutting part 331 in the direction approaching the metal block 31 is limited. As a result, when the stimulus-response member 33 is flipped over, the moving distance of the abutting part 331 is not enough, and therefore the abutting part 331 cannot well abut against the metal block 31, which affects the electrical connection between the metal block 31 and the stimulus-response member 33. Therefore, the energy storage apparatus 200 cannot be short-circuited in time, and the potential safety hazard in using the energy storage apparatus 200 is aggravated. If the angle between the deformation part 333 and the direction in which the metal block 31 and the stimulus-response member 33 are stacked is between 25° and 75°, not only the abutting part 331 can have an enough maximum movable distance, but also the distance that the abutting part 331 needs to move when the stimulus-response member 33 is flipped over can be reduced, so that the energy storage apparatus 200 can be short-circuited in time, thereby improving the safety in using the energy storage apparatus 200.

Figure 12:
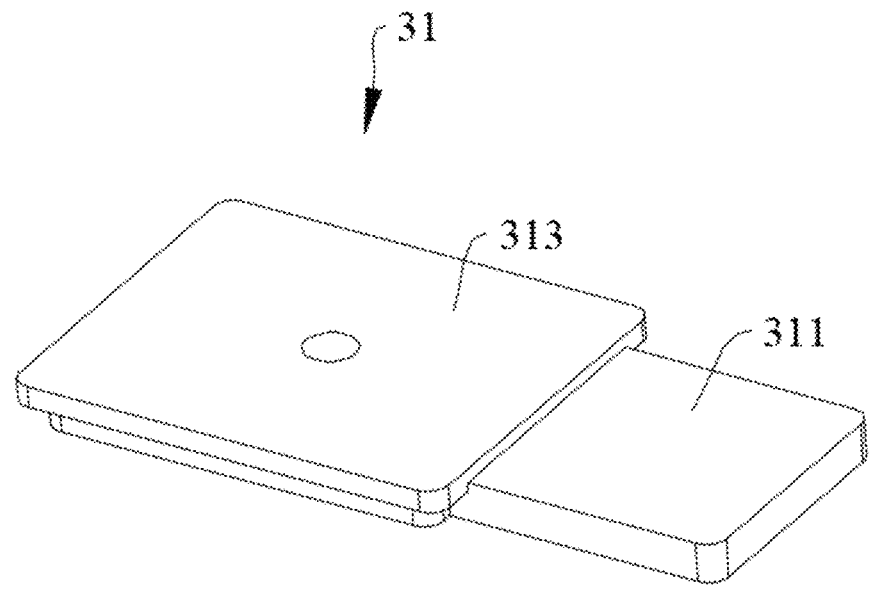
FIG. 12 is a schematic structural diagram of a metal block according to an embodiment of the present disclosure.

As illustrated in FIG. 12, in some embodiments, the metal block 31 includes a first part 311 and a second part 313 connected to each other. The first part 311 is configured to abut against the abutting part 331 when the abutting part 331 moves in the direction approaching the metal block 31, so that the metal block 31 is electrically connected to the top cover 10. The second part 313 is configured to be electrically connected to an external power-consuming device.

It may be understood that an orthographic projection of the abutting part 331 on a surface of the first part 311 facing the stimulus-response member 33 falls within a range of the surface of the first part 311 facing the stimulus-response member 33. The second part 313 and the stimulus-response member 33 are arranged in a staggered manner.

Optionally, the metal block 31 may be, but is not limited to, aluminum or the like.

As illustrated in both FIG. 5 and FIG. 8, in some embodiments, the pole assembly 30 further includes an upper plastic member 35, a pole 37, and a sealing member 39. The upper plastic member 35 is at least partially located between the metal block 31 and the top cover 10, and is configured to insulate the metal block 31 from the top cover 10. The upper plastic member 35 is sleeved on a part of the metal block 31. A surface of the first part 311 facing the stimulus-response member 33 is partially exposed out of the upper plastic member 35. A surface of the second part 313 away from the top cover 10 is partially exposed out of the upper plastic member 35. The pole 37 passes through the top cover 10 and the upper plastic member 35, and is electrically connected to the second part 313 of the metal block 31. An end of the pole 37 away from the metal block 31 is configured to be electrically connected to the electrode assembly 230 of the energy storage apparatus 200 (that is, the pole 37 is electrically connected to the electrode assembly 230 by the connector 210). The pole 37 is insulated from the top cover 10. The sealing member 39 is sleeved on an outer circumference of the pole 37, for insulating the pole 37 from the top cover 10, and the sealing member 39 is further configured to seal a gap between the pole 37 and the top cover 10, so as to improve the air tightness of the top cover 10.

It may be understood that, in this embodiment, the positive pole assembly 30a includes the metal block 31, the upper plastic member 35, the pole 37, and the sealing member 39. The negative pole assembly 30b also includes the metal block 31, the upper plastic member 35, the pole 37, and the sealing member 39.

It should be noted that the upper plastic member 35 is arranged surrounding a part of peripheries of the metal block 31, a surface of the first part 311 facing the stimulus-response member 33 is partially exposed out of the upper plastic member 35, and a surface of the second part 313 away from the top cover 10 is partially exposed out of the upper plastic member 35. It may be understood that the upper plastic member 35 and the metal block 31 are of an integral injection molding structure, that is, the upper plastic member 35 is directly injected on the metal block 31 by injection molding. In other words, the surface of the first part 311 away from the stimulus-response member 33 is wrapped by the upper plastic member 35, and the surface of the second part 313 facing the top cover 10 is provided with the upper plastic member 35, so that the upper plastic member 35 can protect the first part 311, to prevent the first part 311 from deforming, after being hit, in the direction approaching the stimulus-response member 33, to abut against the abutting part 331 by mistake.

Figure 13:
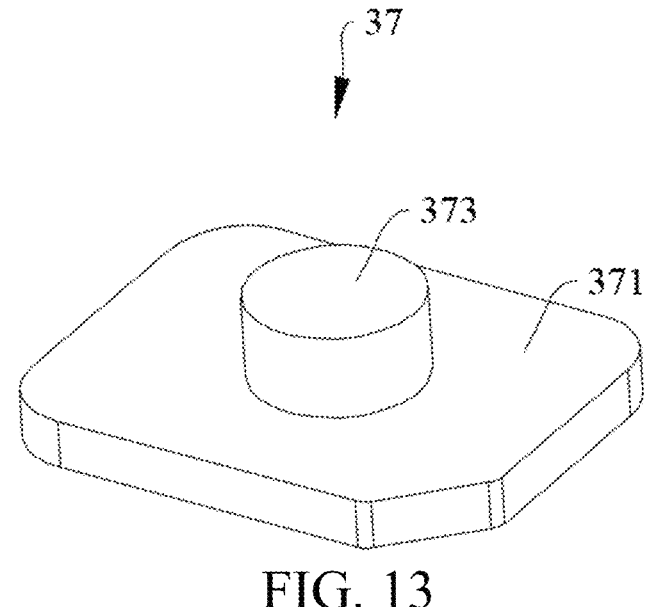
FIG. 13 is a schematic structural diagram of a pole according to an embodiment of the present disclosure.

As also illustrated in FIG. 13, optionally, the pole 37 includes a first flange part 371 and a first penetration part 373 protruding from a surface of the first flange part 371. The first flange part 371 is located at a side of the top cover 10 away from the metal block 31, and the first penetration part 373 sequentially passes through the top cover 10, the upper plastic member 35, and the second part 313 of the metal block 31, to be connected (for example, riveted) to the second part 313.

Optionally, the sealing member 39 is sleeved on an outer circumference of the first penetration part 373, for insulating the pole 37 from the top cover 10, and the sealing member 39 is further configured to seal a gap between the first penetration part 373 and the top cover 10, so as to improve the air tightness of the top cover 10.

Figure 14:
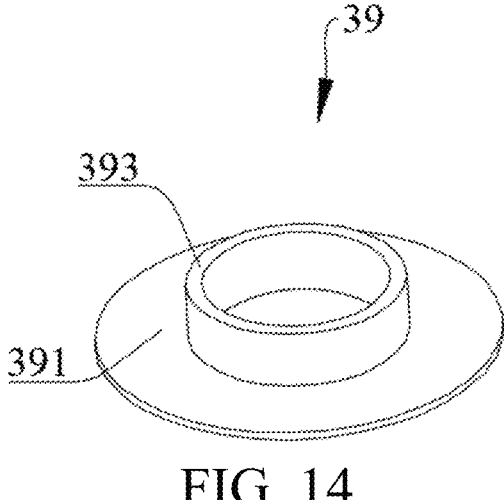
FIG. 14 is a schematic structural diagram of a sealing member according to an embodiment of the present disclosure.

As also illustrated in FIG. 14, optionally, the sealing member 39 includes a second flange part 391 and a second penetration part 393 protruding from a surface of the second flange part 391. The second flange part 391 is located between the first flange part 371 and the top cover 10, the second penetration part 393 passes through the top cover 10, and both the second flange part 391 and the second penetration part 393 are sleeved on an outer circumference of the first penetration part 373 of the pole 37, so that the pole 37 is insulated from the top cover 10. It may be understood that the first penetration part 373 sequentially passes through the sealing member 39, the top cover 10, the upper plastic member 35, and the metal block 31, and is electrically connected to the metal block 31.

Optionally, the top cover 10 may be, but is not limited to, an aluminum plate or the like.

Figure 15:
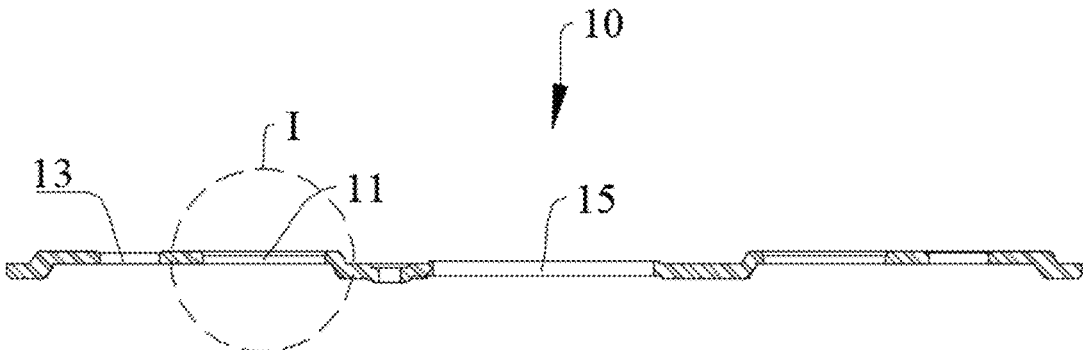
FIG. 15 is a schematic cross-sectional structural diagram of a top cover along a line A-A in FIG. 3 according to an embodiment of the present disclosure.
Figures 16, 17:
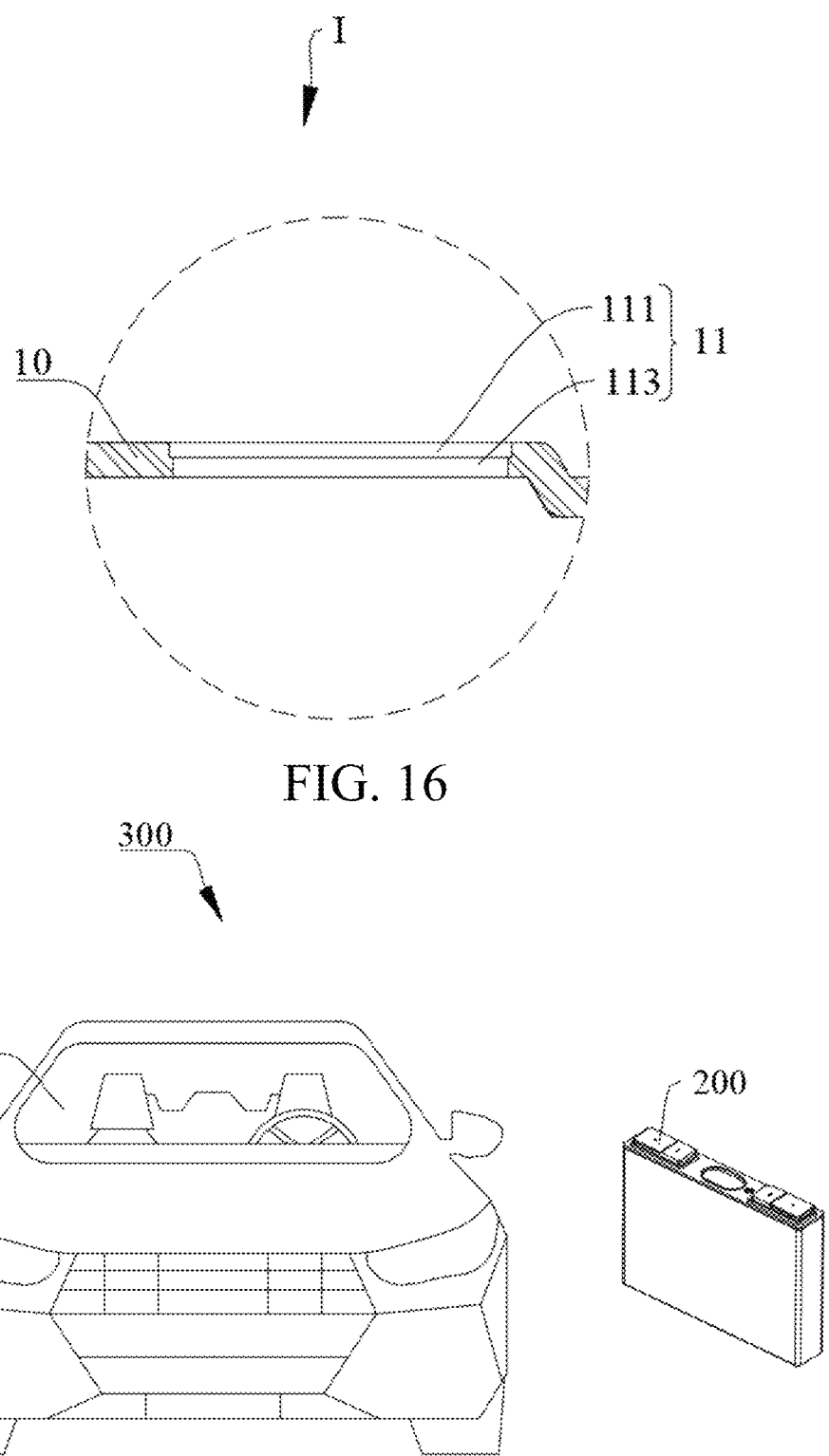
FIG. 16 is an enlarged diagram of dotted line box I in FIG. 15.
FIG. 17 is a schematic structural diagram of a power-consuming device according to an embodiment of the present disclosure, where the energy storage apparatus and the power-consuming device body are in a separate state.

As illustrated in FIG. 15 and FIG. 16, in some embodiments, the through hole 11 includes a first sub-hole 111 and a second sub-hole 113 communicated with each other. The first sub-hole 111 is closer to the metal block 31 than the second sub-hole 113. A radial size of the first sub-hole 111 is greater than a radial size of the second sub-hole 113. The stimulus-response member 33 is disposed in the first sub-hole 111. The connecting part 335 abuts against the top cover 10 to define a bottom wall of the first sub-hole 111, and is connected to the top cover 10 to define a side wall of the first sub-hole 111. It may be understood that the first sub-hole 111 and the second sub-hole 113 are arranged in the direction in which the metal block 31 and the top cover 10 are stacked, the first sub-hole 111 extends through the surface of the top cover 10 facing the metal block 31, the second sub-hole 113 extends through the surface of the top cover 10 away from the metal block 31, the first sub-hole 111 and the second sub-hole 113 form a stepped hole, and the stimulus-response member 33 is disposed in the first sub-hole 111. In this way, in-advance deformation or flip-over of the stimulus-response member 33 caused by squeezing of the stimulus-response member 33 during assembling of the end cover assembly 100, which affects the performance of the energy storage apparatus 200 using the end cover assembly 100 can be better avoided. In addition, the stimulus-response member 33 is disposed in the first sub-hole 111, that is, the position close to the metal block 31 in the through hole 11. In this way, the moving distance of the abutting part 331 during the deformation or flip-over of the stimulus-response member 33 can be reduced, so that when the internal pressure of the energy storage apparatus 200 increases to a particular extent, the stimulus-response member 33 can be flipped over more timely and in a shorter time, to enable the abutting part 331 to abut against the metal block 31; and therefore, the energy storage apparatus 200 can be short-circuited more timely, thereby improving the use safety of the energy storage apparatus 200.

Optionally, in the direction in which the metal block 31 and the top cover 10 are stacked, a depth of the first sub-hole 111 is in a range of 0.3 mm to 1.35 mm. Specifically, the depth of the first sub-hole 111 may be, but is not limited to, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.35 mm, or the like. If the depth of the first sub-hole 111 is excessively shallow, the surface of the connecting part 335 facing the metal block 31 cannot be guaranteed to be lower than (that is, recessed in) the surface of the top cover 10 facing the metal block 31 after the connecting part 335 is welded to the top cover 10. If the depth of the first sub-hole 111 is excessively deep, the surface of the connecting part 335 away from the metal block 31 may be lower than (that is, protrude from) the surface of the top cover 10 away from the metal block 31, which may easily lead to deformation failure caused by touching of the stimulus-response member 33 by mistake during assembling of other components of the end cover assembly 100.

Optionally, the explosion-proof hole 15 is provided at a center position of the top cover 10. An air pressure of the energy storage apparatus 200 at a portion corresponds to the center position is maximum, and by disposing the explosion-proof sheet 71 at the center position of the top cover 10, explosion can be performed in time to relieve the pressure of the energy storage apparatus 200 when the internal pressure of the energy storage apparatus 200 reaches a preset bursting pressure.

In some embodiments, the top cover 10 is further provided with a penetration hole 13. The penetration hole 13 is provided adjacent to a side of the through hole 11 away from the explosion-proof hole 15, and the penetration hole 13 is configured to receive the first penetration part 373 of the pole 37 and the second penetration part 393 of the sealing member 39.

Optionally, the top cover 10 is a strip-shaped plate structure, that is, the top cover 10 has a long edge and a short edge. The penetration hole 13 and the through hole 11 are spaced apart from each other along a long edge direction of the top cover 10, and the penetration hole 13 is disposed closer to an end portion of the top cover 10 than the through hole 11. It may be understood that the end cover assembly 100 is of an elongated structure.

Again as illustrated in FIG. 8, in some embodiments, the explosion-proof sheet 71 is arranged at a side of the explosion-proof hole 15 close to the lower plastic member and is welded to the top cover 10. The explosion-proof assembly 70 further includes a protection sheet 73. The protection sheet 73 is arranged on the surface of the top cover 10 facing the metal block 31, and is configured to seal an opening of the explosion-proof hole 15 facing the metal block 31, so as to avoid overflowing of the electrolyte from the energy storage apparatus 200 by preventing the explosion-proof sheet 71 from being damaged due to hit by an external object.

In some embodiments, the end cover assembly 100 of the embodiments of the present disclosure further includes a lower plastic member 50. The lower plastic member 50 is arranged at a side of the top cover 10 away from the metal block 31. When applied to the energy storage apparatus 200, the lower plastic member 50 is closer to the electrode assembly 230 of the energy storage apparatus 200 than the top cover 10, and is configured to insulate the top cover 10 from the electrode assembly 230 of the energy storage apparatus 200.

It should be noted that, in this embodiment, the first flange part 371 of the pole 37 is arranged at a side of the lower plastic member 50 away from the top cover 10, and the lower plastic member 50 is arranged between the first flange part 371 and the top cover 10. It may be understood that, when the pole 37 is assembled, the first penetration part 373 of the pole 37 sequentially passes through the sealing member 39, the lower plastic member 50, the top cover 10, the upper plastic member 35, and the metal block 31, and is electrically connected to the metal block 31. It may be understood that the pole 37 is electrically connected to the metal block 31, but is insulated from the top cover 10 and the stimulus-response member 33.

Optionally, a first vent hole 51 is defined at a position where the lower plastic member 50 overlaps with the stimulus-response member 33. The first vent hole 51 is configured to communicate an air path between the stimulus-response member 33 and the electrode assembly 230 of the energy storage apparatus 200, so that when the internal pressure of the energy storage apparatus 200 increases, the pressure can be transferred to the stimulus-response member 33 in time. Optionally, a second vent hole 53 is defined at a position where the lower plastic member 50 overlaps with the explosion-proof assembly 70, so as to communicate an air path between the explosion-proof assembly 70 and the energy storage apparatus 200.

Figure 2:
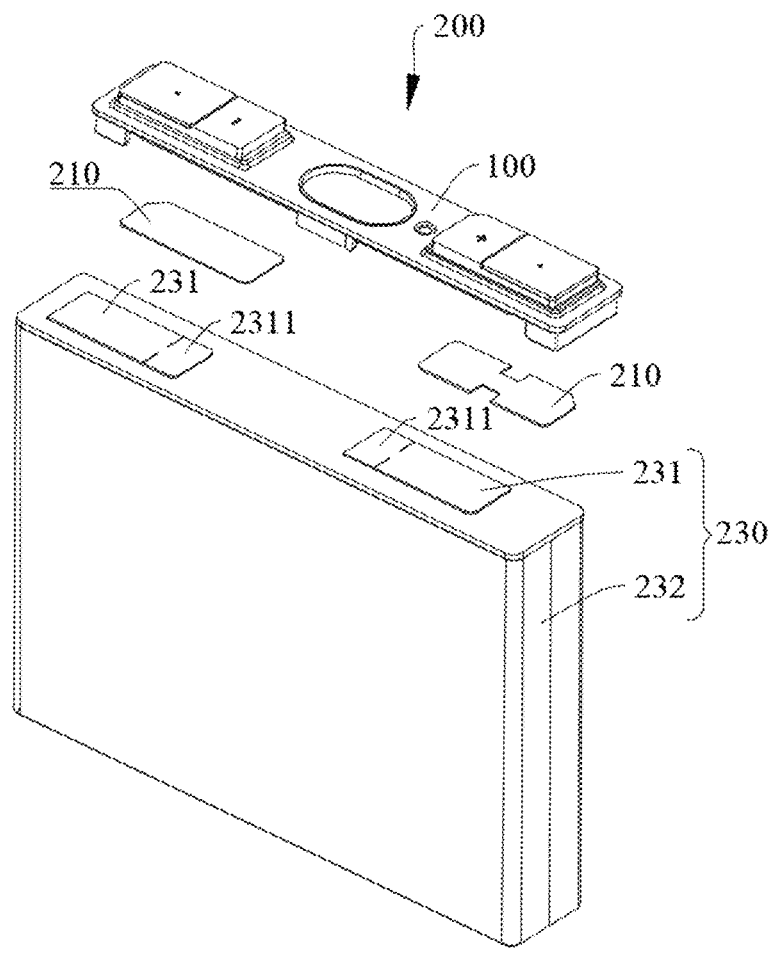
FIG. 2 is a schematic partially-exploded structural diagram of an energy storage apparatus according to an embodiment of the present disclosure.

Again as illustrated in FIG. 2, optionally, the electrode assembly 230 further includes an electrode 232 and a tab 231 electrically connected to the electrode 232. The tab 231 is electrically connected to an end portion of the connector 210 away from the pole 37. The electrode 232 includes a current collector and an electrode active layer disposed on a surface of the current collector. The current collector is electrically connected to the tab 231. It may be understood that the electrode 232 may include a positive electrode and a negative electrode.

It may be understood that when the pole assembly 30 is the positive pole assembly 30a, the pole 37 is the positive pole 37, the connector 210 is the positive connector 210, the tab 231 is the positive tab 231, and the electrode 232 is the positive electrode. When the pole assembly 30 is the negative pole assembly 30b, the pole 37 is the negative pole 37, the connector 210 is the negative connector 210, the tab 231 is the negative tab 231, and the electrode 232 is the negative electrode.

In some embodiments, the tab 231 is provided with a welding part 2311 welded to the connector 210. An orthographic projection of the welding part 2311 on the preset surface 301 falls within a range of an orthographic projection of the stimulus-response member 33 on the preset surface 301. It may be understood that the stimulus-response member 33 is at least partially overlapped with the welding part 2311. The pole 37 of the end cover assembly 100 and the stimulus-response member 33 are spaced apart along an extending direction of the top cover 10. One end of the connector 210 is welded to the pole 37, the other end is welded to the tab 231, and the welding part 2311 is disposed below the stimulus-response member 33. In this way, the space of the end cover assembly 100 along the extending direction of the top cover 10 or the end cover assembly 100 is reduced, and the length of the end cover assembly 100 is reduced.

As illustrated in FIG. 17, embodiments of the present disclosure further provide a power-consuming device 300, which includes a power-consuming device body 310 and the energy storage apparatus 200 described in the embodiments of the present disclosure, where the energy storage apparatus 200 is configured to supply power to the power-consuming device body 310.

The power-consuming device 300 of the embodiments of the present disclosure may be, but is not limited to, a portable electronic device such as a mobile phone, a tablet computer, a notebook computer, a desktop computer, a smart bracelet, a smart watch, an electronic reader, or a game console, or may be a transportation tool such as an automobile, a truck, a car, a van, a bullet train, a high-speed train, or an electric automatic, or may be various home appliances or the like.

It may be understood that the power-consuming device 300 described in this implementation is only a form of the power-consuming device 300 to which the end cover assembly 100 is applied, and should not be understood as a limitation to the power-consuming device 300 provided in the present disclosure, nor should it be understood as a limitation to the end cover assembly 100 provided in the implementations of the present disclosure.

Reference in the present disclosure to an "embodiment" or "implementation" means that a particular feature, structure, or characteristic described in combination with the embodiments may be included in at least one embodiment of the present disclosure. The appearances of the phrase in various places in the specification are not necessarily all referring to the same embodiment, nor are separate or alternative embodiments mutually exclusive of the other embodiments. It is explicitly and implicitly understood by a person skilled in the art that the embodiments described in the present disclosure may be combined with other embodiments. In addition, it should also be understood that, if there is no contradiction therebetween, the features, structures, or characteristics described in the embodiments of the present disclosure may be arbitrarily combined to form another embodiment that does not depart from the spirit and scope of the technical solutions of the present disclosure.

Finally, it should be noted that the foregoing implementations are only intended for describing the technical solutions of the present disclosure but not for limiting the present disclosure. Although the present disclosure is described in detail with reference to the above preferred embodiments, a person of ordinary skill in the art should understand that modifications or equivalent replacements can be made to the technical solutions of the present disclosure without depart-
ing from the spirit and scope of the technical solutions of the
present disclosure.

What is claimed is:

1. An energy storage apparatus, comprising: an electrode
assembly, a connector, and an end cover assembly, wherein
the connector is electrically connected to the electrode
assembly, the end cover assembly is arranged at a side of the
connector away from the electrode assembly, and the end
cover assembly comprises:

a pole assembly, wherein the pole assembly comprises a
metal block, the metal block is electrically connected to
the connector, and the metal block has a preset surface;

a top cover disposed at an interval with the preset surface
of the metal block, wherein the top cover defines a
through hole and an explosion-proof hole arranged at
an interval with each other, and an orthographic pro-
jection of the through hole on the preset surface falls
within a range of the preset surface;

a stimulus-response member sealing the through hole and
connected to the top cover, wherein the stimulus-
response member is configured to abut against the
metal block to short-circuit the energy storage appara-
tus in response to the energy storage apparatus reaching
a first pressure value, the stimulus-response member
comprises an abutting part, a deformation part, and a
connecting part which are sequentially connected in a
bent manner, the deformation part is arranged sur-
rounding peripheries of the abutting part, and the
connecting part is arranged surrounding peripheries of
the deformation part, the connecting part is connected
to the top cover, the deformation part is bent from an
end of the connecting part away from the top cover in
a direction away from the metal block, the abutting part
is configured to abut against the metal block to short-
circuit the energy storage apparatus in response to the
energy storage apparatus reaching the first pressure
value, a minimum thickness of the deformation part is
less than a thickness of the abutting part and is less than
a thickness of the connecting part, and a range of the
minimum thickness $d1$ of the deformation part is 0.3
mm$\leq d1 \leq 1.0$ mm, a range of the thickness $d3$ of the
abutting part is 1.6 mm$\leq d3 \leq 3.4$ mm, and a range of the
thickness $d4$ of the connecting part is 0.45 mm$\leq d4 \leq 1.5$
mm; and an explosion-proof assembly comprising an explosion-
proof sheet, wherein the explosion-proof sheet is con-
figured to seal the explosion-proof hole and is con-
nected to the top cover, and the explosion-proof sheet
is configured to burst in response to the energy storage
apparatus reaching a second pressure value, wherein
the explosion-proof sheet is located in the explosion-
proof hole, the explosion-proof sheet is provided with
a notch, a thickness of an outer periphery portion of the
explosion-proof sheet connected to or welded to the top
cover is greater than a thickness of a center portion of
the explosion-proof sheet, each of the thickness of the
center portion and the thickness of the outer periphery
portion of the explosion-proof sheet is greater than a
thickness of the notch, and a range of a ratio of the
minimum thickness $d1$ of the deformation part to a
minimum thickness $d2$ of the explosion-proof sheet is
$2 \leq d1/d2 \leq 3$;

wherein a range of a ratio of the first pressure value P1 to
the second pressure value P2 is $0.4 \leq P1/P2 \leq 0.87$, and a
thickness of the stimulus-response member is in a range
of 0.1 mm to 6.2 mm.

2. The energy storage apparatus according to claim 1,
wherein a range of a difference between the second pressure
value P2 and the first pressure value P1 is 0.1 Mpa$\leq$P2–
P1$\leq$0.3 Mpa.

3. The energy storage apparatus according to claim 1,
wherein a range of the first pressure value P1 is 0.35
Mpa$\leq$P1$\leq$0.65 Mpa; and a range of the second pressure
value P2 is 0.75 Mpa$\leq$P2$\leq$1.05 Mpa.

4. The energy storage apparatus according to claim 1,
wherein the pole assembly comprises a positive pole assem-
bly and a negative pole assembly, and the stimulus-response
member comprises a positive stimulus-response member
and a negative stimulus-response member, the positive
stimulus-response member is configured to deform to abut
against the metal block of the positive pole assembly in
response to the energy storage apparatus reaching a first
sub-pressure value P11, the negative stimulus-response
member is configured to deform to abut against the metal
block of the negative pole assembly in response to the
energy storage apparatus reaching a second sub-pressure
value P12, wherein P12<P11, and the first pressure value P1
is the first sub-pressure value P11 or the second sub-pressure
value P12.

5. The energy storage apparatus according to claim 1,
wherein a range of the minimum thickness $d2$ of the explo-
sion-proof sheet is 0.05 mm$\leq d2 \leq 0.15$ mm.

6. The energy storage apparatus according to claim 1,
wherein a range of an angle $\alpha$ between a surface of the
deformation part facing the metal block and a direction in
which the metal block and stimulus-response member are
stacked is: $25° \leq \alpha \leq 75°$.

7. The energy storage apparatus according to claim 1,
wherein the pole assembly further comprises a pole, the pole
passes through the top cover and is insulated from the top
cover, and the pole is electrically connected to each of the
metal block and the connector; and the electrode assembly comprises an electrode and a tab
electrically connected to the electrode, the tab is pro-
vided with a welding part welded to the connector, and
an orthographic projection of the welding part on the
preset surface falls within an orthographic projection of
the stimulus-response member on the preset surface.

8. The energy storage apparatus according to claim 2,
wherein the pole assembly further comprises a pole, the pole
passes through the top cover and is insulated from the top
cover, and the pole is electrically connected to each of the
metal block and the connector; and the electrode assembly comprises an electrode and a tab
electrically connected to the electrode, the tab is pro-
vided with a welding part welded to the connector, and
an orthographic projection of the welding part on the
preset surface falls within an orthographic projection of
the stimulus-response member on the preset surface.

9. The energy storage apparatus according to claim 3,
wherein the pole assembly further comprises a pole, the pole
passes through the top cover and is insulated from the top
cover, and the pole is electrically connected to each of the
metal block and the connector; and the electrode assembly comprises an electrode and a tab
electrically connected to the electrode, the tab is pro-
vided with a welding part welded to the connector, and
an orthographic projection of the welding part on the
preset surface falls within an orthographic projection of
the stimulus-response member on the preset surface.

10. The energy storage apparatus according to claim 4,
wherein the pole assembly further comprises a pole, the pole
passes through the top cover and is insulated from the top cover, and the pole is electrically connected to each of the metal block and the connector; and the electrode assembly comprises an electrode and a tab electrically connected to the electrode, the tab is provided with a welding part welded to the connector, and an orthographic projection of the welding part on the preset surface falls within an orthographic projection of the stimulus-response member on the preset surface.

11. The energy storage apparatus according to claim 5, wherein the pole assembly further comprises a pole, the pole passes through the top cover and is insulated from the top cover, and the pole is electrically connected to each of the metal block and the connector; and the electrode assembly comprises an electrode and a tab electrically connected to the electrode, the tab is provided with a welding part welded to the connector, and an orthographic projection of the welding part on the preset surface falls within an orthographic projection of the stimulus-response member on the preset surface.

12. A power-consuming device, comprising:

a power-consuming device body; and an energy storage apparatus configured to supply power to the power-consuming device body and comprising an electrode assembly, a connector, and an end cover assembly, wherein the connector is electrically connected to the electrode assembly, the end cover assembly is arranged at a side of the connector away from the electrode assembly, and the end cover assembly comprises:

a pole assembly, wherein the pole assembly comprises a metal block, the metal block is electrically connected to the connector, and the metal block has a preset surface;

a top cover disposed at an interval with the preset surface of the metal block, wherein the top cover defines a through hole and an explosion-proof hole arranged at an interval with each other, and an orthographic projection of the through hole on the preset surface fall within a range of the preset surface;

a stimulus-response member sealing the through hole and connected to the top cover, wherein the stimulus-response member is configured to abut against the metal block to short-circuit the energy storage apparatus in response to the energy storage apparatus reaching a first pressure value, the stimulus-response member comprises an abutting part, a deformation part, and a connecting part which are sequentially connected in a bent manner, the deformation part is arranged surrounding peripheries of the abutting part, and the connecting part is arranged surrounding peripheries of the deformation part, the connecting part is connected to the top cover, the deformation part is bent from an end of the connecting part away from the top cover in a direction away from the metal block, the abutting part is configured to abut against the metal block to short-circuit the energy storage apparatus in response to the energy storage apparatus reaching the first pressure value, a minimum thickness of the deformation part is less than a thickness of the abutting part and is less than a thickness of the connecting part, and a range of the minimum thickness d1 of the deformation part is 0.3 mm≤d1≤1.0 mm, a range of the thickness d3 of the abutting part is 1.6 mm≤d3≤3.4 mm, and a range of the thickness d4 of the connecting part is 0.45 mm≤d4≤1.5 mm; and an explosion-proof assembly comprising an explosion-proof sheet, wherein the explosion-proof sheet is configured to seal the explosion-proof hole and is connected to the top cover, and the explosion-proof sheet is configured to burst in response to the energy storage apparatus reaching a second pressure value, wherein the explosion-proof sheet is located in the explosion-proof hole, the explosion-proof sheet is provided with a notch, a thickness of an outer periphery portion of the explosion-proof sheet connected to or welded to the top cover is greater than a thickness of a center portion of the explosion-proof sheet, each of the thickness of the center portion and the thickness of the outer periphery portion of the explosion-proof sheet is greater than a thickness of the notch, and a range of a ratio of the minimum thickness d1 of the deformation part to a minimum thickness d2 of the explosion-proof sheet is 2≤d1/d2≤3;

wherein a range of a ratio of the first pressure value P1 to the second pressure value P2 is 0.4≤P1/P2≤0.87, and a thickness of the stimulus-response member is in a range of 0.1 mm to 6.2 mm.

13. The power-consuming device according to claim 12, wherein a range of a difference between the second pressure value P2 and the first pressure value P1 is 0.1 Mpa≤P2−P1≤0.3 Mpa.

14. The power-consuming device according to claim 12, wherein a range of the first pressure value P1 is 0.35 Mpa≤P1≤0.65 Mpa; and a range of the second pressure value P2 is 0.75 Mpa≤P2≤1.05 Mpa.

15. The power-consuming device according to claim 12, wherein the pole assembly comprises a positive pole assembly and a negative pole assembly, and the stimulus-response member comprises a positive stimulus-response member and a negative stimulus-response member, the positive stimulus-response member is configured to deform to abut against the metal block of the positive pole assembly in response to the energy storage apparatus reaching a first sub-pressure value P11, the negative stimulus-response member is configured to deform to abut against the metal block of the negative pole assembly in response to the energy storage apparatus reaching a second sub-pressure value P12, wherein P12<P11, and the first pressure value P1 is the first sub-pressure value P11 or the second sub-pressure value P12.

16. The power-consuming device according to claim 12, wherein a range of the minimum thickness d2 of the explosion-proof sheet is 0.05 mm≤d2≤0.15 mm.

17. The power-consuming device according to claim 12, wherein a range of an angle α between a surface of the deformation part facing the metal block and a direction in which the metal block and stimulus-response member are stacked is: 25°≤α≤75°.

18. The power-consuming device according to claim 12, wherein the pole assembly further comprises a pole, the pole passes through the top cover and is insulated from the top cover, and the pole is electrically connected to each of the metal block and the connector; and the electrode assembly comprises an electrode and a tab electrically connected to the electrode, the tab is provided with a welding part welded to the connector, and an orthographic projection of the welding part on the preset surface falls within an orthographic projection of the stimulus-response member on the preset surface.

19. The energy storage apparatus according to claim 1, wherein the through hole comprises a first sub-hole and a second sub-hole communicated with each other, the first sub-hole is closer to the metal block than the second sub-hole, and a radial size of the first sub-hole is greater than a radial size of the second sub-hole; and in a direction in which the metal block and the top cover are stacked, a depth of the first sub-hole is in a range of 0.3 mm to 1.35 mm.

20. The energy storage apparatus according to claim 1, wherein on a plane where a surface of the top cover positioned facing away from the connector is located, an orthographic projection of the explosion-proof hole completely overlaps an orthographic projection of the explosion-proof sheet.

\* \* \* \* \*